Aug. 9, 1949.　　　　S. ROSE ET AL　　　　2,478,641
DOCUMENT-OPERATED CAMERA CONTROL
Filed Nov. 5, 1945　　　　　　　　　　　5 Sheets-Sheet 2

INVENTORS
SAMUEL ROSE
BENJAMIN ROSE
BY
Edw. S. Higgins
ATTORNEY

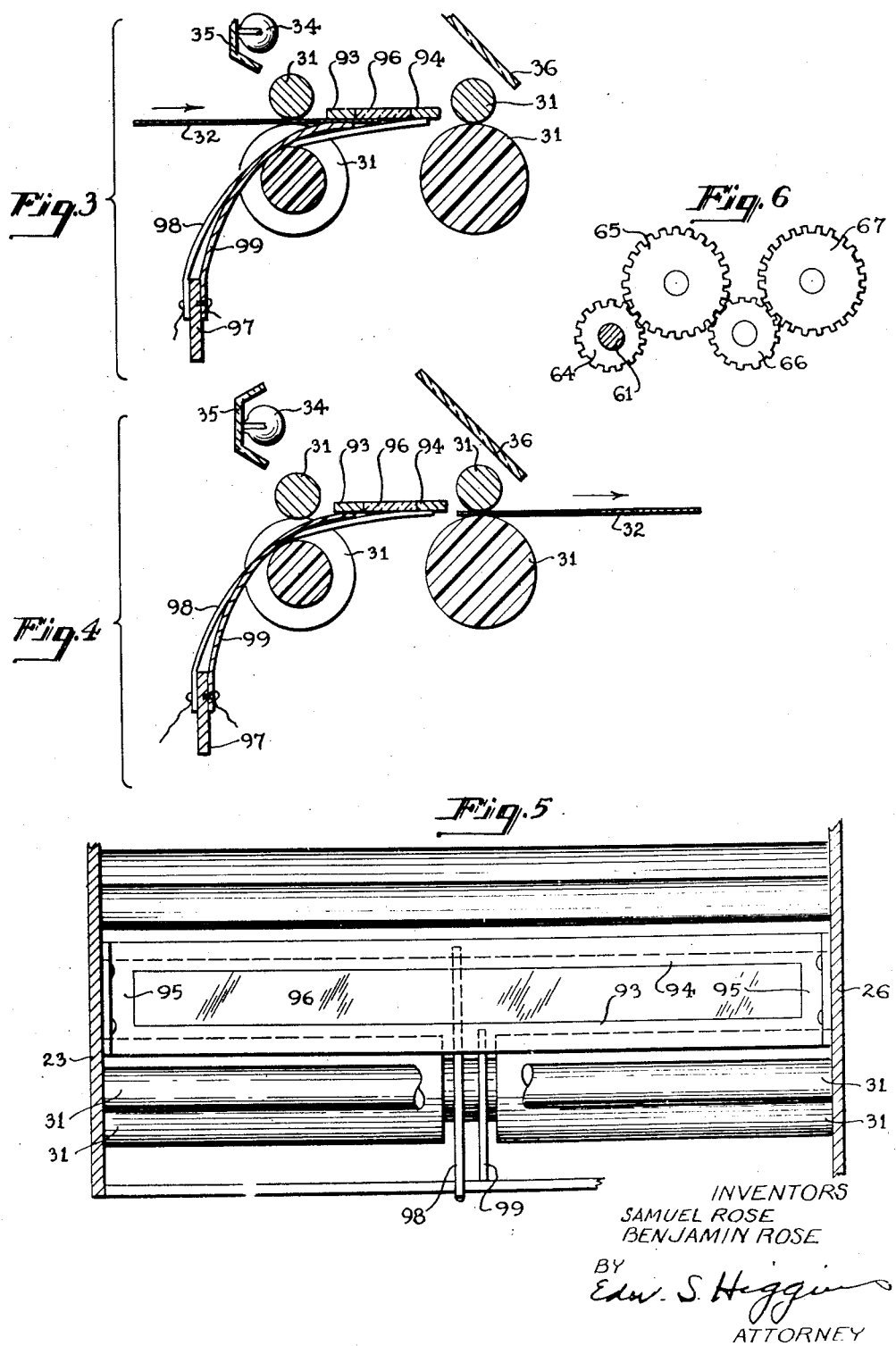

Aug. 9, 1949.                    S. ROSE ET AL                        2,478,641
                        DOCUMENT-OPERATED CAMERA CONTROL
Filed Nov. 5, 1945                                              5 Sheets-Sheet 4
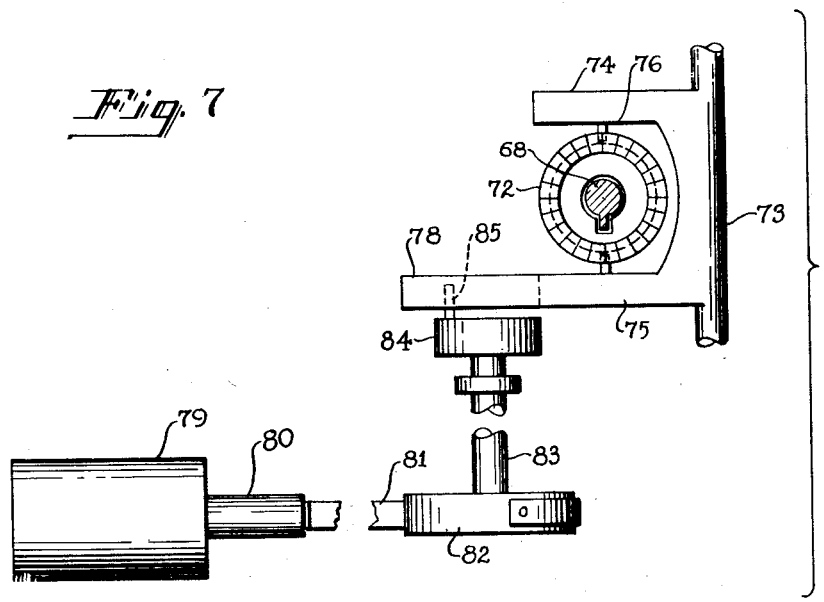
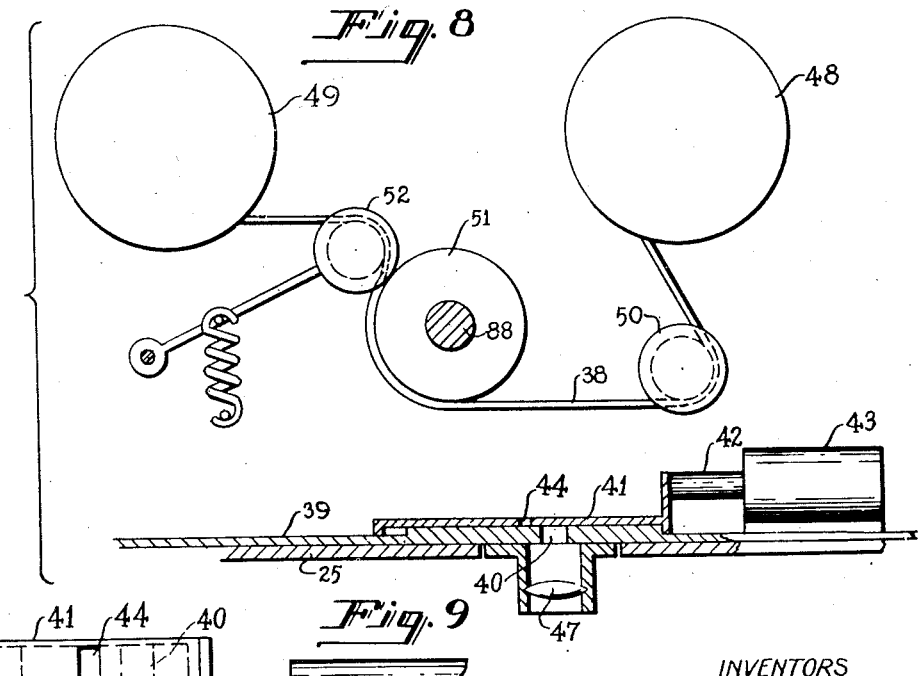
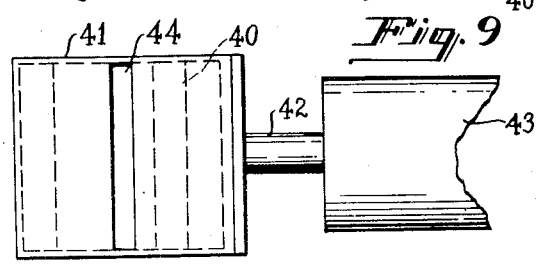
INVENTORS
SAMUEL ROSE
BENJAMIN ROSE
BY
Edw. S. Higgins
ATTORNEY Aug. 9, 1949.                S. ROSE ET AL                2,478,641
                    DOCUMENT-OPERATED CAMERA CONTROL
Filed Nov. 5, 1945                              5 Sheets-Sheet 5

INVENTORS
SAMUEL ROSE
BENJAMIN ROSE
BY
Edw. S. Higgins

Patented Aug. 9, 1949

2,478,641

UNITED STATES PATENT OFFICE 2,478,641

DOCUMENT-OPERATED CAMERA CONTROL

Samuel Rose and Benjamin Rose,
New York, N. Y.

Application November 5, 1945, Serial No. 626,713

1 Claim. (Cl. 88—24)

This invention relates particularly to cameras.

A primary object of the invention is to provide a camera that reproduces subject matter that may be conveniently stored in a relatively small space and may be permanent in nature so that the copy may be inspected at any desired future time by means of a projection or enlarging device.

Another object is to provide a camera in which the received material is recorded in such a reduced manner as to be properly termed "microphoto" inasmuch as the individual elements or letters of the received material are considerably too small to be directly readable and the said material is too small to be directly usable.

Another object is to provide a copying camera which is automatically operated after the starting switch is closed and which is foolproof during operation.

Another object is to provide an electrically operated camera in which after the machine is set in operation, the object to be photographed first advances and subsequently the film is advanced, the shutter is opened and the lights are turned on to full brilliance simultaneously and synchronously.

Another object is to provide such a camera in which the object to be photographed serves as the medium for opening and closing various electrical circuits.

Another object is to provide a camera of this kind with improved means for actuating the film driving mechanism.

Another object is to provide a camera of this kind with means for obtaining uniform light intensity instantly.

Another object is to provide a camera of this kind that is efficient in operation, compact in construction and inexpensive to manufacture.

Other objects and advantages of the invention will appear from the description thereof to follow taken in connection with the accompanying drawings, in which—

Fig. 3 is a sectional view on the plane of the line 3—3 of Fig. 2 showing the sheet to be copied entering between the contacts to break the circuit.

Fig. 4 is a view similar to Fig. 3 but showing the sheet leaving the contacts for closing the circuit.

Fig. 5 is a detail plan view of the switch parts shown in Fig. 3, parts being broken away.

Fig. 6 is a sectional view on the plane of the line 6—6 of Fig. 2.

Fig. 7 is a sectional view taken on the plane of the line 7—7 of Fig. 2.

Fig. 8 is a sectional view taken on the plane of the line 8—8 of Fig. 2.

Fig. 9 is a sectional view taken on the plane of the line 9—9 of Fig. 2.

Figure 1:
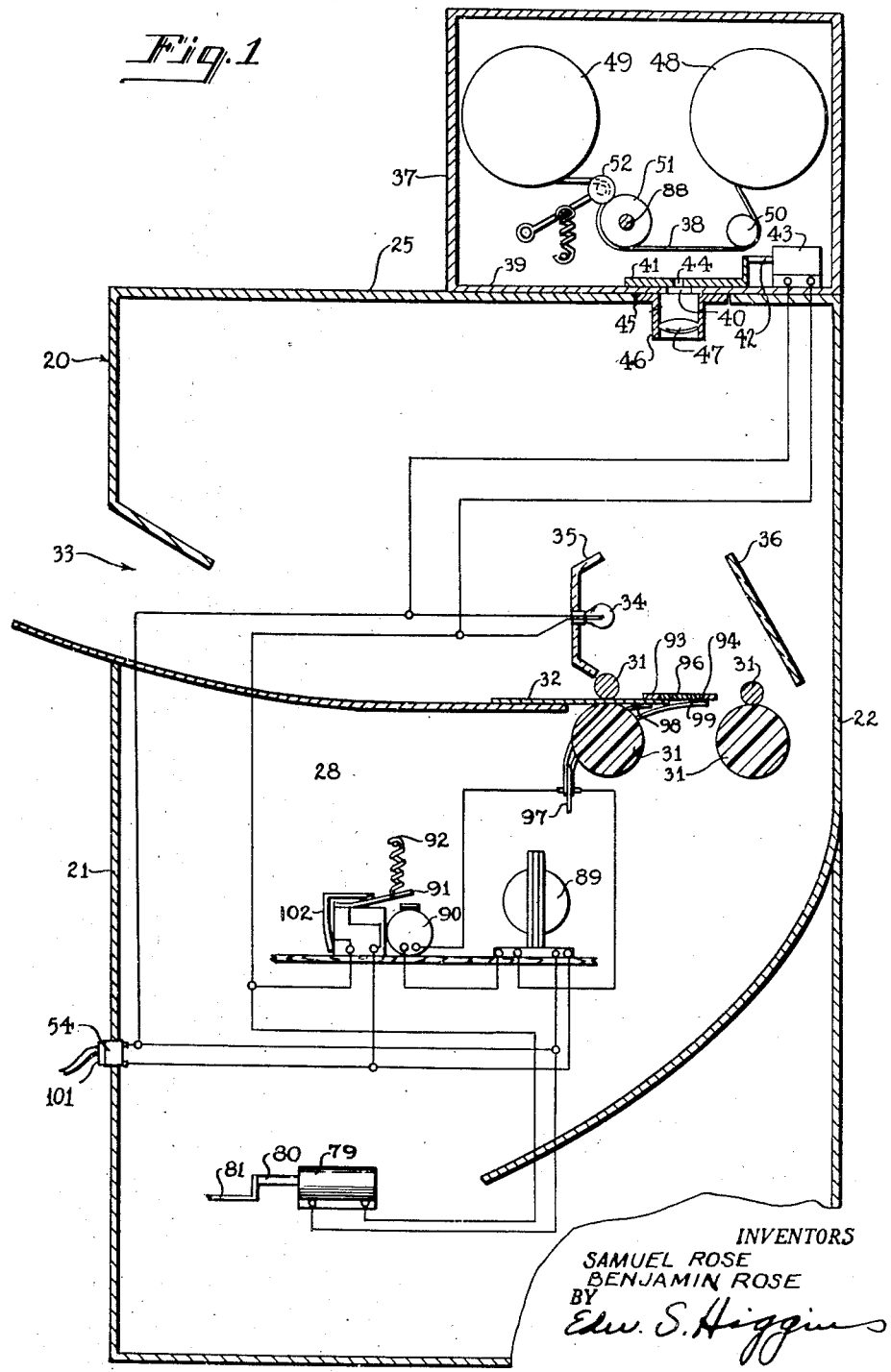
Fig. 1 is a part vertical sectional and part diagrammatical view of a camera embodying the invention.
Figure 2:
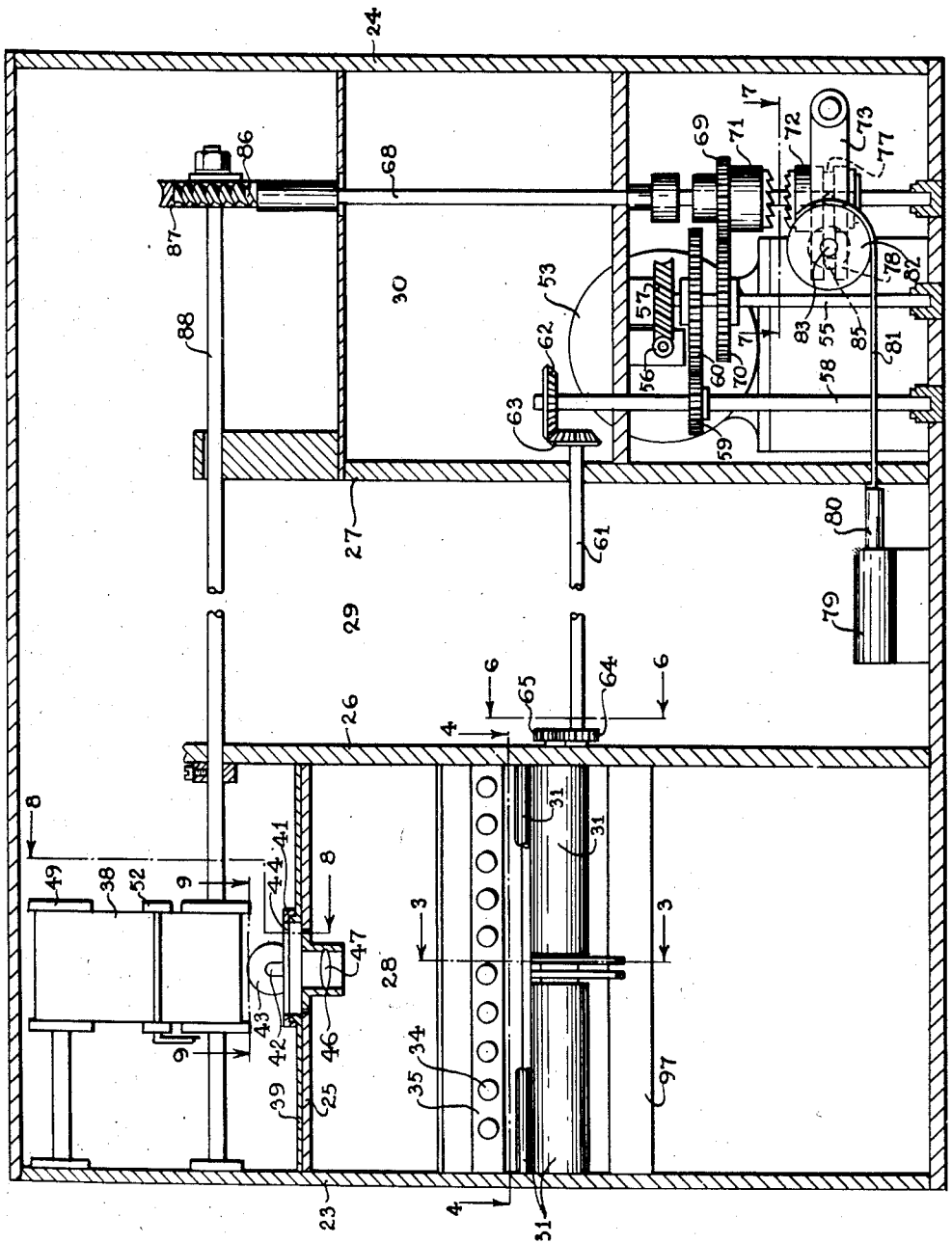
Fig. 2 is a sectional view through the camera housing, parts being omitted and parts being broken away for the sake of clearness.

Referring to the drawings, the improved camera comprises a main housing 20 having a front wall 21, rear wall 22, side walls 23, 24 and top wall 25. Upright partition walls 26 and 27 divide the housing into compartments 28, 29 and 30. In compartment 28, rotatably mounted between the walls 23 and 26 are pairs of spaced rollers 31 for supporting and transporting the object to be photographically copied, such as a sheet 32 of paper having printed or typewritten matter thereon. It will be understood however that any other document or object might be used in place of a sheet of paper, the paper being used for purposes of illustration merely. The sheet is manually fed to the rollers through an opening 33 in the front wall 21. A row of incandescent lamps 34 are mounted above the rollers for illuminating the interior of the housing at the time the exposure takes place. Behind and surrounding the row of lamps is a reflector 35 which reflects the rays of the lamps onto a mirror 36 supported opposite the reflector.

On top of the main housing is another housing 37 for supporting the film 38. The bottom wall or floor 39 of this film housing or compartment is provided with an exposure opening 40 and mounted on the floor adjacent the exposure opening is the shutter mechanism including the shutter plate 41 operatively connected to the core 42 of a solenoid 43 adapted to be brought into an electrical circuit as will hereinafter be described. The shutter plate has an opening 44 adapted to register with the exposure opening 40, in the floor 39. Top wall 25 of the main housing is also provided with an opening 45 aligned with opening 40. A tubular member 46 is positioned in the opening 45 and mounted in this tubular member is a lens 47.

Supported on the wall of the film compartment are spaced film spools 48 and 49, one of which, spool 48 serves to support the unexposed film and the other, the take-up spool 49, supports the film after it has been exposed. As the film goes from the spool 48 it passes under a transverse guide roller 50 and then travels longitudinally over the shutter plate 41, under a friction drive roller 51, over a spring pressed tension roller 52 and then on to the take-up spool 49.

In the compartment 30 is housed the mechanism for actuating the movable parts of the camera. This mechanism includes a motor 53, connected through a socket 54 on the main housing 20 to a suitable source of electric power such as the house supply. A vertically disposed rotatable shaft 55 is operatively connected to the worm drive shaft 56 of the motor by means of a worm gear 57. Another rotatable shaft 58 parallel to shaft 55 has a gear 59 meshing with a gear 60 on the shaft 55 whereby the shaft 58 is driven. Shaft 58 is connected to one end of a horizontally disposed shaft 61 by means of intermeshing bevel gears 62 and 63 on shafts 58 and 61, respectively. The other end of shaft 61 has a gear 64 in mesh with a gear 65 on the end of one of the rollers 31. A gear 66 carries the drive from said roller to a gear 67 on the other roller for driving the latter as will be seen from Fig. 6.

The mechanism for advancing the film includes an upright rotatable shaft 68 parallel with shaft 55. Loosely mounted on the lower end of this shaft 68 is an idler gear 69 which meshes with a gear 70 fixed on shaft 55. Fixed on the idler gear 69 and depending therefrom is a clutch member 71 and keyed to the shaft 68 for vertical movement therealong is a clutch dog or member 72, which clutch dog is fixed to the shaft for rotation therewith. A fork member 73 is pivotally supported from the bottom wall of the compartment with its spaced arms 74 and 75 spanning the clutch dog 72 and connected thereto by pins 76 projecting into a peripherial groove 77 on the clutch dog. Arm 75 is provided with a slotted or bifurcated extension 78. A solenoid 79 has its core 80 connected by a flexible band 81 to a disk 82 fixed to one end of a shaft 83 rotatably supported from the floor of the compartment. On the other end of the shaft 83 is a cam member 84 having a pin 85 eccentrically mounted with respect to the axis of the shaft 83 and projecting from one face of the cam into the slot of the extension 78 of arm 75. When the solenoid is energized and its core 80 drawn in, the disk 82 is rotated thereby lifting the fork upwardly to force the clutch dog 72 into engagement with the clutch member 71 whereby the drive is brought from the idler gear 69 to the clutch dog 72 and thence to the shaft 68 as will be understood.

Fixed on the upper end of shaft 68 is a worm 86 which is in mesh with a worm wheel 87 fixed on one end of a horizontally disposed shaft 88 rotatably supported by the walls 26 and 27. The other end of shaft 88 is connected to the friction drive roller 51 for advancing the film as will be understood. By this arrangement of gearing, the motor may be operated at a relatively high speed while the film is transported through the film gate at a relatively slow speed. Furthermore, the film may be advanced at a predetermined rate of movement commensurate with the rate of movement of the sheet or other object whereby a microphoto recording of the subject matter may be reproduced on the film. The arrangement may be such that the film travels 18 times faster than the sheet or other object to be photographed, which arrangement has been found satisfactory for this work. Of course any other desired and suitable ratio may be used.

Suitably mounted in the main housing and electrically connected to the electric power is a step-down transformer 89 for reducing the voltage to 6 volts. In circuit with the transformer is a 6-volt double throw relay device 90, having an arm 91 normally urged away from the relay device by a spring 92.

Supported between the walls 23 and 26 and positioned in the space between the pairs of rollers 31 is a rectangular shaped metal frame member consisting of a front bar 93 and a rear bar 94 spaced therefrom, which bars are connected together by end bars 95. A glass window 96 is supported in the space between the bars. Mounted on a cross-piece 97 in the compartment 28 and normally in engagement with the front bar 93 is a yieldably mounted or flexible contact member 98 and a similar flexible contact 99 in yieldable engagement with the rear bar 94. These contacts 98 and 99 are electrically connected to the relay 90.

Another step-down transformer 100 is connected to the electric power line for reducing the voltage to 40 volts through the lamps 34 for dimming and preheating said lamps when the camera is not photographing.

Figure 10:
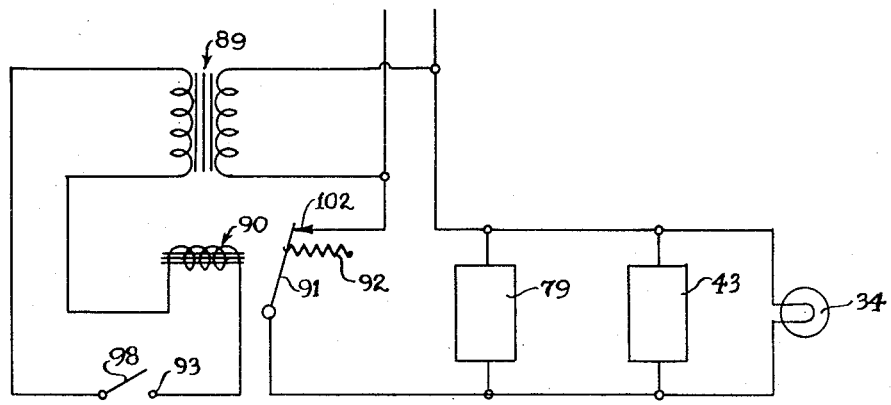
Fig. 10 is a diagrammatic view showing the electrical circuit used with the camera.
Figure 11:
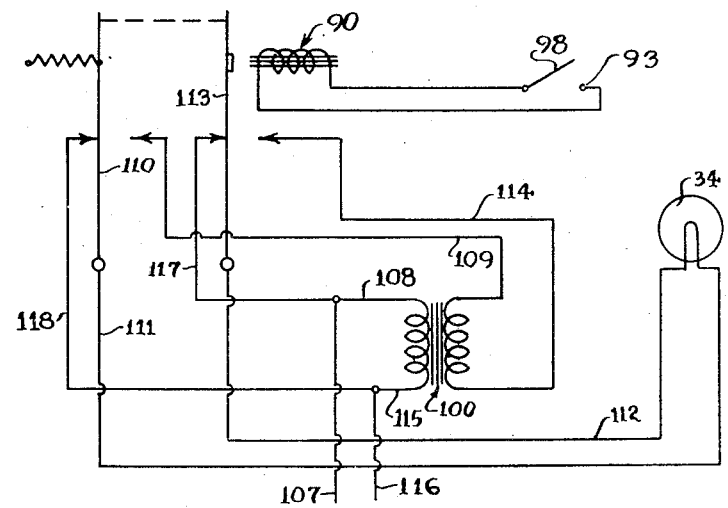
Fig. 11 is a diagrammatic view showing the electrical circuit for the lamps for illuminating the camera.

Referring to Figs. 10 and 11 which show the electric circuits, it will be seen that the solenoids 43 and 79 and the lamps 34 are connected in parallel. Assuming that the plug 101 (Fig. 1) is in operative position in the socket 54 and that the switch (not shown) has been closed, the motor 53 will be in operation and the rollers 31 started for transporting the sheet 32 or other object through the conveyor. Simultaneously current will pass through the transformer 89 and relay device 90 thereby energizing said relay device which draws its arm 91 away from the contact 102 (Fig. 10) thereby breaking the 110-volt circuit through said relay device 90 and lamps 34.

When the relay device 90 is thus energized, the circuit through the transformer 100 in the lamp circuit is closed thereby reducing the voltage for dimming the lamps. Referring to Fig. 11, this lamp dimming circuit includes the wires 107, 108, transformer 100 to the 40-volt side thereof, wire 109, arm 110, wire 111, lamp 34, wire 112, arm 113, wire 114, transformer 100, wire 115 to wire 116.

The parts will remain in this condition, that is, the rollers 31 will continue to rotate and the lamps will be on but dimmed and the other moving parts will be stopped until a sheet 32 of paper is inserted between the forward pair of rollers 31 and its entering edge moved between the movable contact 98 and the forward bar 93 of the frame whereby said contact 98 is mechanically moved away from contact with said forward bar 93 (see Figs. 1, 3 and 4) and the circuit through the relay device 90 is opened, and the transformer is automatically cut out.

When this occurs, the relay device becomes deenergized and the arm 91 of the relay is pulled by the spring 92 (see Fig. 10) to close the circuit through the solenoid 79 thereby energizing said solenoid. When the solenoid 79 is thus energized, it draws its core 80 inwardly pulling the flexible band 81 thereby rotating the disc 82 which in turn rotates the shaft 83 carrying the cam member 84. The cam member through its pin 85 lifts the fork 73 upwardly and due to the connection between the fork and clutch dog 72, said clutch dog is slid along the shaft 68 into operative engagement with the clutch member 71 depending from the idler gear 69 whereby the shaft 68 is rotated. Rotation of shaft 68 drives shaft 88 with its friction roller 51 for advancing the film 38.

Simultaneously and synchronously with the energization of the solenoid 79, the solenoid 43 which is connected in parallel therewith is brought into the circuit and becomes energized. When the solenoid 43 is energized, it draws its core 42 inwardly which moves the shutter plate 41 across the exposure opening 40 so as to align the shutter opening 44 with said exposure opening and with the lens 47 for photographing the sheet 32 or other object therebeneath.

And simultaneously and synchronously with the energization of the solenoids 79 and 43, the transformer 100 is taken out of circuit and the full 110-volts passes through the lamps 34 thereby bringing said lamps to full brilliance instantly due to the preheating of the same. Referring to Fig. 11, the circuit through the lamps 34 is then as follows: wires 107, 117, arm 113, wire 112, lamp 34, wire 111, arm 110, wire 118 to wire 116.

Due to the preheated condition of the lamps, full brilliance takes place instantly so that there is uniform light intensity for photographing from beginning to end of the exposure. Furthermore, because of this preheating, smaller lamps than ordinary may be used.

The foregoing described synchronized movements of the film and shutter and the turning on of full brilliance of the lamps are initiated by the breaking of the circuit by the entering edge of the moving sheet 32 and this condition continues during the passage of said sheet across the window 96 in the frame because of the insulating character of the sheet. During this passage of the sheet the subject matter thereon will be photographed. The distance between the front bar 93 and the rear bar 94 of the frame is such that when the entering edge of the sheet passes over the window 96 such entering edge reaches and comes between the rear bar 94 and the movable contact 99 and moves said movable contact away from said rear bar 94 thereby breaking the circuit at this point before the rear or trailing edge of the sheet leaves the movable contact member 98. The circuit remains broken by this sheet 32 until its rear edge moves beyond the movable contact 99 at which time the circuit through the relay device 90 is again closed energizing said relay which draws the arm 91 inwardly thereby opening the circuit through the solenoids 79 and 43, thus stopping the actuation of the film driving mechanism and the shutter operating mechanism and simultaneously bringing the transformer 100 into circuit for dimming the lamps 34. The parts are now ready for the next cycle of operations.

The arrangement of the lamps, mirror and reflector with respect to the lens is such that all rays of light from the lamps and from the reflecting surfaces will be such as to cause all such rays to be reflected to points beyond the lens thus eliminating reflection or glare of the incident rays into the photographic unit. Furthermore the reflecting surfaces will diffuse and equalize the distribution of light on the objects to be photographed.

The detail available on the recording film is sufficient to afford a recording of printed or typewritten subject matter in a continuous form. When the individual frames of the recorded film are enlarged, the individual frames of the film then become legible and usable.

Changes in details of construction might be made without departing from the principle or scope of the invention.

We claim:

A switch for a photographic copying camera having shutter and film drive controlling solenoids and document feeding means having spaced rotatable rollers, comprising a relay, a frame member having a pair of electricity conducting parallel bars interposed between the rollers of the document feeding means, a glass pane supported by the frame between said bars, in line with the opening in the shutter, a pair of elongated curved movable flexible electricity conducting finger contact members arranged one behind the other in the direction of travel of the document with their ends spaced apart and disposed between said rollers, one of said flexible finger contact members being normally in contact with one of said bars and the other finger contact member being normally in contact with the other of said bars, said movable contact fingers having their ends in the path of movement of said document across the glass pane whereby said document in advancing moves said movable contact fingers successively out of contact with their respective parallel bars for breaking the circuit through said relay and for holding said circuit open until the document moves beyond the movable contact fingers.

SAMUEL ROSE.
BENJAMIN ROSE.

REFERENCES CITED

The following references are of record in the file of this patent:

UNITED STATES PATENTS

| Number | Name | Date |
| --- | --- | --- |
| 1,957,889 | Hopkins | May 8, 1934 |
| 1,966,348 | Hughey | July 10, 1934 |
| 2,011,272 | Duggan | Aug. 13, 1935 |
| 2,107,074 | Hineline | Feb. 1, 1938 |
| 2,201,009 | Oiler | May 14, 1940 |
| 2,235,844 | Nelson | Mar. 25, 1941 |
| 2,291,006 | Stuart | July 28, 1942 |
| 2,292,825 | Dilks | Aug. 11, 1942 |
| 2,329,919 | Loughridge | Sept. 21, 1943 |
| 2,355,268 | Bryce | Aug. 8, 1944 |
| 2,380,034 | Doyle | July 10, 1945 |